US007009975B2

(12) United States Patent
Schoute

(10) Patent No.: US 7,009,975 B2
(45) Date of Patent: Mar. 7, 2006

(54) LOW DELAY AND LOW LOSS PACKET SWITCH

(75) Inventor: Frederik Carel Schoute, Hilversum (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 944 days.

(21) Appl. No.: 09/886,231

(22) Filed: Jun. 21, 2001

(65) Prior Publication Data

US 2002/0012349 A1   Jan. 31, 2002

(30) Foreign Application Priority Data

Jun. 26, 2000   (EP)   .................................. 00202203

(51) Int. Cl.
*H04L 12/28*   (2006.01)

(52) U.S. Cl. .................. 370/394; 370/395.42

(58) Field of Classification Search ................ 370/394, 370/391, 392, 393, 360, 396, 398, 412, 413, 370/415, 417, 386, 389, 395.21, 395.41, 370/395.42, 395.43, 455
See application file for complete search history.

(56) References Cited

U.S. PATENT DOCUMENTS

| 4,942,569 A | 7/1990 | Maeno .......................... 370/60 |
| 5,390,176 A | 2/1995 | Schoute et al. ............. 370/60.1 |
| 5,555,264 A | 9/1996 | Sallberg et al. ................ 370/17 |
| 6,341,313 B1 * | 1/2002 | Kanoh .......................... 709/227 |
| 6,563,826 B1 * | 5/2003 | Shikama ...................... 370/394 |

OTHER PUBLICATIONS

By Chao H.J. et al. "An ATM Queue Manager Handling Multiple Delay and Loss Priorities", IEEE / ACM Transactions on Networking vol. 3, No. 6, Dec. 1, 1995, pp. 652-659.

* cited by examiner

*Primary Examiner*—Phirin Sam
(74) *Attorney, Agent, or Firm*—Larry Liberchuk

(57) ABSTRACT

In a telecommunication switching arrangement where data packets have multi-level indices associated with the loss and delay aspects of the data packet, a mathematical operation on the indices allows the switching arrangement to assign data packets to groups. The sequence in which the data packets are transmitted by the switching arrangement is based on the group to which the data packet belongs. This effectively results in a relative prioritization of the data packets. Additionally, the loss and delay indices determine storage priority and relative priority inside a group. The switching arrangement achieves low loss and low delay for the data packets to be transmitted.

11 Claims, 3 Drawing Sheets

| σ = 2 | 1L & 1D |
|---|---|
| | 1L & 1D |
| | 1L & 1D |
| | 1L & 1D |
| | 1L & 1D |
| σ = 4 | 3L & 1D |
| | 3L & 1D |
| | 2L & 2D |
| | 2L & 2D |
| | 1L & 3D |
| σ = 5 | 4L & 1D |
| | 4L & 1D |
| | 3L & 2D |
| | 3L & 2D |
| σ = 6 | 4L & 2D |
| | 3L & 3D |
| | 1L & 5D |
| | 1L & 5D |
| | 1L & 5D |
| | 1L & 5D |

FIG. 3

LOW DELAY AND LOW LOSS PACKET SWITCH

The present invention relates to a Telecommunication switching arrangement for switching digital data contained in data packets provided with a packet header, which contains a first and a second index representative of a first and a second characteristic of the data packet, the arrangement comprising a crosspoint switch for switching packets from a plurality of input lines of the switch to an output line of the switch, and a sequencer in the crosspoint switch for determining a sequence in which the data packets are to be switched to the output line, and a storage for storing the data packets.

A telecommunication switching arrangement according to the preamble is known from U.S. Pat. No. 5,390,176. This telecommunication switching arrangement determines in which sequence the incoming data packets are to be switched to the output of the switching arrangement. The data packet contains a bit in the header that indicates the type of package. There are two types of packets: lowloss packets and low-delay packets. The switching arrangement contains a buffer to temporarily store packets for which there is insufficient transmission capacity available. Incoming packets are evaluated by the switching arrangement. Low-loss packets always have storage priority over low-delay packets. Low-delay packets are only stored when sufficient storage capacity is available. This results in a switching arrangement where low-delay packets are processed more quickly then low-loss packets, while low-loss packets are less likely to be lost then low-delay packets.

In view of recent developments towards switching arrangements that provide Quality of Service it is insufficient to provide only two service classes for the data packets. Several aspects of the data packet must be considered, as well as several priority levels within one aspect.

A disadvantage of the telecommunication switching arrangement according to U.S. Pat. No. 5,390,176 is that the switching arrangement is incapable of determining the sequence in which data packets with several priority levels per aspect are to be switched to the output line.

An object of the present invention is to provide a telecommunication switching arrangement according to the preamble that can determine the sequence in which the data packets with several priority levels per aspect are to be switched to the output line.

To achieve said object the present invention is characterized in that the sequencer is operative to determine the sequence in which the data packets are to be switched to the output line based on a result of a mathematical operation on the first index and the second index.

The data packet contains two indices in the header. Each index represents an aspect of the data packet. The index has a range, and the value of the index represents the relative priority of the data packet within the aspect. Both indices together define a service class to which the data packet belongs.

By combining the first and second index of the data packet by means of a mathematical operation into one result, it is possible to create groups of different service classes, where the result indicates the group to which the data packet belongs. Depending on the mathematical operation the various aspects of the data packet can be given a certain weight in the result of the mathematical operation. The sequencer compares the result of the mathematical operation of several data packets thus establishing clear relative priorities between the data packets. Based on these relative priorities between the data packets the sequencer can determine the sequence in which the data packets are to be switched to the output line.

An embodiment of the present invention is characterized in that the mathematical operation is the addition of the first index and the second index.

The first and second index are added, and the sequencer uses the result of the addition to establish the priority between the data packets. If a lower value of an index is equivalent to a higher priority, the result of the addition of two indices with low values is again a low value, representing a data packet with high priority. The result of the addition of two indices with high values is a high value representing a data packet with a low priority.

A further embodiment of the present invention is characterized that the mathematical operation is the multiplication of the first index and the second index.

The first and second index are multiplied, and the sequencer uses the result of the addition to establish the priority between the data packets. If a lower value of an index is equivalent to a higher priority, the result of the multiplication of two indices with low values is again a low value, representing a data packet with high priority. The result of the multiplication of two indices with high values is a high value representing a data packet with a low priority.

A further embodiment of the present invention is characterized that the sequence for packets with an equal result of the mathematical operation of the first and second index is based on the index that is representative of a predetermined packet characteristic of the data packet.

In the event that the results of the mathematical operation of data packets are equal the sequencer uses a predetermined index in the header of the data packet to establish the relative priority of the data packets. The predetermined index is this way effectively being used twice in establishing relative priority, through the mathematical operation and by using it as a sub-index. This allows the sequencer to tailor the sequence to the availability of particular resources, that are related to the predetermined index. If insufficient resources are available the sequencer can determine which data packets will be handled and which data packet can be delayed by storing the data packet in the storage or even discarded.

The present invention will now be explained with reference to the drawings.

FIG. 3 shows the division of the storage to accommodate the groups.

Figure 1:
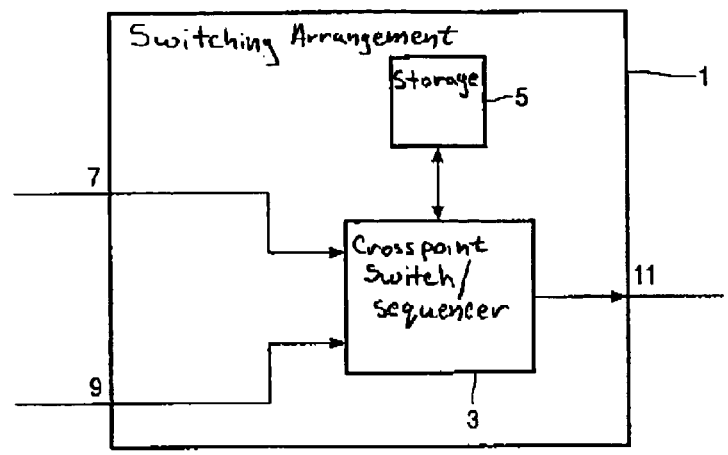
FIG. 1 shows a telecommunication switching arrangement according to the invention

The switching arrangement 1 in FIG. 1 comprises a crosspoint switch 3 that is connected to a storage 5. Incoming data packets containing a header arrive at an input 7 and an input 9. The crosspoint switch 3 comprises a sequencer that extracts a first and a second index from the header of each data packet and performs a mathematical operation on the first and second index which results in a value which indicates the priority of the data packet. Based on a result of the mathematical operation the sequencer determines if and where the data packet should be placed in the storage 5. When transmission capacity is available at an output 1 the sequencer 3 fetches a data packet with the highest priority from the storage 5 and transmits the data packet via the output 11.

Figure 2:
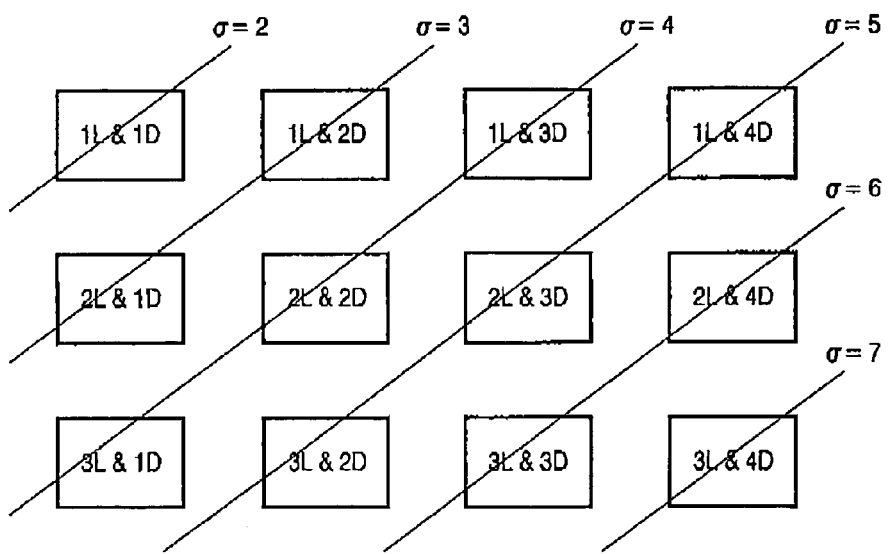
FIG. 2 shows the establishment of service classes when the indices are added.

FIG. 2 shows the establishment of groups in the case that the indices are added.

The first index L is a loss index that indicates the importance of the data packet not being lost. The second index D is a delay index that indicates the importance of the data packet not being delayed. Although FIG. 2 is based on addition as the mathematical operation, other mathematical operations are possible in combination with a corresponding range of values for the indices as long as the result of the mathematical operation consistently assigns the data packet to a group having the proper priority.

In FIG. 2 a low value of an index indicates that the correspondent aspect is highly important while a high value indicates a low importance. The value of an index is effectively a ranking of the data packets for the corresponding aspect.

The header of a data packet can contain for example the values L=1 and D=2 indicating that it is very important that the data packet will not be lost while it is less important that the data packet is not delayed. The precise combination of one L value and one D value is called a service class. Data packets having identical L and D values in their headers are members of the same service class The notation used for a service class is xL&yD where x is the L value and y is the D value.

This makes it possible to create an unlimited number of service classes. In this example the range of x is 1 . . . 3 and the range of y is 1 . . . 4, resulting in 12 service classes of data packets.

By adding x and y, the L value and the D value, an index sum $\sigma$ is obtained that can be used to determine the priority of the data packet. The index sum $\sigma$ is called a group. A 3L&1D data packet, a 2L&2D data packet, and a 1L&3D data packet are all members of the same group with $\sigma=4$ and hence have the same priority. Each group gets a share of the transmission capacity.

The use of 12 service classes in this example to leads to 6 groups: $\sigma=2 \ldots 7$.

FIG. 3 shows the division of the storage to accommodate the groups.

To each group a section of the storage 5 is assigned that functions as a logical queue for the data packets that belong to that group $\sigma$. The figure shows logical queues for the groups $\sigma=2, 4, 5, 6$.

The sections can be fixed or variable, allowing the sequencer 3 to optimize the use of the storage 5 by increasing or decreasing the logical queues depending on the size of the storage 5 and the storage requirements of each group. In FIG. 3 no data packets of the group with index-sum $\sigma=3$ are to be stored and hence no section of the storage 5 was assigned to this group.

Figure 4:
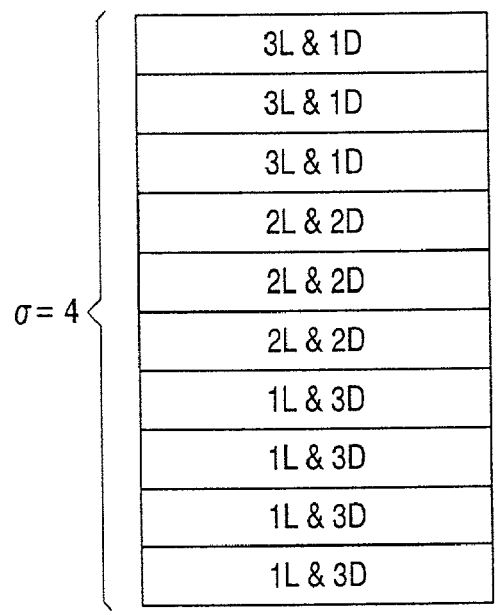
FIG. 4 shows a section of the storage that is used as a logical queue for a group.

FIG. 4 shows a section of the storage that is used as a logical queue for a group.

In this example the logical queue of the group with index-sum $\sigma=4$ is shown. The data packets are sorted within the logical queue so that data packets with a lower value of the delay index (D-value) are first to be fetched from the storage section. When new data packets arrive that are member of a group but have a lower value of the delay index than some data packets already in the logical queue the data packets is placed in front of those data packets already in the logical queue. This results in a sorting of the data packets in the logical queue based on their D-value, ensuring that data packets with a low D-value in a group are transmitted first. Data packets in a group that have an identical D-value are placed in chronological order to ensure the lowest delay possible for each data packet.

When data packets of group $\sigma$ are being fetched from the storage the sequencer will give priority to the service class (of that group) with the lowest D-value. A threshold $\Delta_\sigma$ is defined to which the number of data packets of each service class is compared. The sequencer checks whether any of the service classes contain a number of data packets with a lower L-Value than the one currently being fetched that exceeds the threshold $\Delta_\sigma$. If so the sequencer switches, after completion of the current data packet, to the service class in the current group that exceeds the threshold $\Delta_\sigma$ most. If none of the service classes exceed the threshold $\Delta_\sigma$ the sequencer continues fetching data packets from the current service class.

The loss index (L-value) determines, when the storage is full, which packets will be stored for further processing and which ones will be discarded. When a data packet of service class 2L&2D needs to be stored then data packets of service class 3L&4d, 3L&3D, 3L&2D and 3L&1D (in this order) will be purged from the storage to make room for the data packet with service class 2L&2D. If there are no data packets that can be purged the new data packet will not be stored and will be lost.

The measures of the present invention thus ensure low loss and low delay for the data packets to be transmitted by effectively handling storage priority and putting the data packets in an optimal sequence for transmission.

Figure 5:
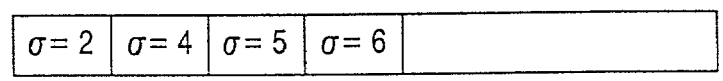
FIG. 5 shows a transmission sequence in which each group has an assigned transmission capacity.

FIG. 5 shows a transmission sequence in which each group has an assigned transmission capacity. The transmission capacity can be assigned according to the Minimum Fair Queuing principle. With Minimum Fair Queuing each group has its own logical queue and out of each logical queue data packets will be fetched until the logical queue is empty or a predetermined maximum of data packets has been fetched from the logical queue whichever comes first. The predetermined maximum is based on reservations made by protocols such as RSVP. Minimum Fair Queuing prevents starvation that is assuming that the total reserved capacity is not higher than the available capacity, each logical queue gets at least what it has reserved. Assuming that there are no data packets in group $\sigma=3$ to be transmitted, no capacity has been reserved for this group.

Figure 6:
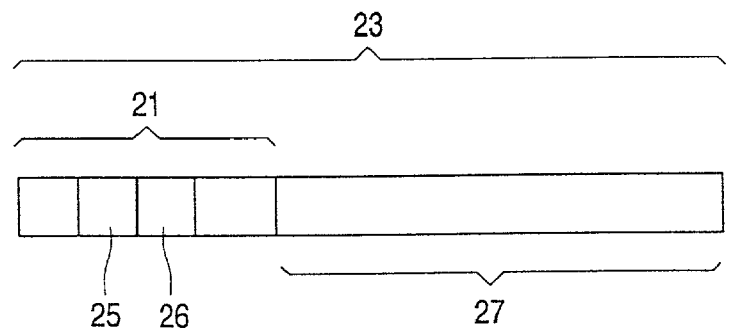
FIG. 6 shows the structure of the data packet

FIG. 6 shows the structure of the data packet.

The data packet 23 contains a header 21 and a data section 27. The header contains the first index 25 and the second index 26.

What is claimed is:

1. Telecommunication switching arrangement (1) for switching digital data contained in data packets (23) provided with a packet header (21), which contains a first (25) and a second index (26) representative of a first and a second priority characteristic of the data packet (23), the arrangement (1) comprising a crosspoint switch (3) for switching packets (23) from a plurality of input lines (5, 7) of the switch (1) to an output line (11) of the switch (1), and a sequencer in the crosspoint switch (3) for determining a sequence in which the data packets (23) are to be switched to the output line (11), and a storage (5) for temporarily storing the data packets (23), characterized in that the sequencer is operative to determine the sequence in which the data packets (23) are to be switched to the output line (11) based on a result of a mathematical operation on the first index (25) and the second index (26).

2. Telecommunication switching arrangement (1) according to claim 1, characterized in that the indices (25, 26) are arranged to contain multilevel values.

3. Telecommunication switching arrangement (1) according to claim 1, characterized in that the mathematical operation is the addition of the first index (25) and the second index (26).

4. Telecommunication switching arrangement (1) according to claim 1, characterized in that the mathematical operation is the multiplication of the first index (25) and the second index (26).

5. Telecommunication switching arrangement (1) according to claim 1, characterized in that the first packet characteristic of the data packet (23) is a packet loss priority.

6. Telecommunication switching arrangement (1) according to claim 1, characterized in tat the second packet characteristic of the data packet (23) is a packet delay priority.

7. Telecommunication switching arrangement (1) according to claim 1, characterized in that the sequence for data packets (23) wit an equal result of the mathematical operation is based on a predetermined one of the indices (25, 26).

8. Telecommunications switching arrangement (1) according to claim 5 characterized in that the sequencer is operative to determine whether or not to temporarily store data packets (23) based on the packet loss priority.

9. Telecommunications switching arrangement (1) according to claim 5, characterized in that the sequencer is operative to purge a data packet (23) from the storage (5), based on the packet loss priority when the number of data packets (23) in the storage (5) exceeds a predetermined threshold value.

10. Method for determining a sequence in which incoming data packets (23) are to be switched from an input line (7, 9) to an output line (11) of a telecommunication switching arrangement (1) where the data packets (23) contain a first (25) and a second index (26) representative of a first and a second priority characteristic of the data packet (23) and where the switching arrangement (1) comprises a storage (5) the method including the following steps: receiving a data packet (23) performing a mathematical operation on the first (25) and the second index (26) determining a sequence in which the data packets (23) are to be switched to the output line (11) based on the result of the mathematical operation.

11. Telecommunication switching arrangement for switching digital data in data packets provided with a packet header, which has a first and a second index representative of a first and a second priority characteristic of the data packet, the arrangement comprising a crosspoint switch for switching packets from a plurality of input lines of the switch to an output line of the switch, and a sequencer in the crosspoint switch for determining a sequence in which the data packets are to be switched to the output line, and a storage for temporarily storing the data packets, such tat the sequencer is operative to determine the sequence in which the data packets are to be switched to the output line based on a result of a mathematical operation on the first index and the second index.

* * * * *